(12) United States Patent
Chen et al.

(10) Patent No.: US 8,400,429 B2
(45) Date of Patent: Mar. 19, 2013

(54) TOUCH DEVICE AND TOUCH METHOD

(75) Inventors: Hsu-Hung Chen, Taoyuan (TW); Chien-Hung Lin, Taoyuan County (TW); Bo-Yi Wu, New Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 90 days.

(21) Appl. No.: 13/064,759

(22) Filed: Apr. 13, 2011

(65) Prior Publication Data

US 2012/0105374 A1  May 3, 2012

(30) Foreign Application Priority Data

Nov. 3, 2010   (TW) .............................. 99137815 A

(51) Int. Cl.
*G06F 3/042* (2006.01)
(52) U.S. Cl. ...................... 345/175; 345/173; 178/18.01
(58) Field of Classification Search .......... 345/173–179; 178/18.01–18.04
See application file for complete search history.

(56) References Cited

U.S. PATENT DOCUMENTS

| 2001/0026268 A1* | 10/2001 | Ito ................................. 345/175 |
| 2010/0141963 A1* | 6/2010 | Hsu et al. ...................... 356/614 |
| 2011/0199335 A1* | 8/2011 | Li et al. ......................... 345/175 |

* cited by examiner

*Primary Examiner* — Kimnhung Nguyen
(74) *Attorney, Agent, or Firm* — Rabin & Berdo, P.C.

(57) ABSTRACT

A touch device to sense and compute the coordinate of a touch object is provided. The touch device comprises a panel, a light-emitting element, an image sensor, a reflective strip and a processing unit. The panel has a sensing area surrounded by first to fourth boundaries where the first and the third boundaries define an x direction and the other two boundaries defines y direction. The light-emitting element and the image sensor are located on the first boundary with a specific distance therebetween. The reflective strip is located on the second to fourth boundaries. When the touch object touches the sensing area, a first and a second light path from the light-emitting element to the image sensor are blocked to form a real and a virtual image such that the processing unit computes the coordinate of the touch object according to the real and the virtual images. A touch method is disclosed herein as well.

13 Claims, 4 Drawing Sheets

TOUCH DEVICE AND TOUCH METHOD

RELATED APPLICATIONS

This application claims priority to Taiwan Application Serial Number 099137815, filed Nov. 3, 2010, which is herein incorporated by reference.

BACKGROUND

1. Technical Field

The present disclosure relates to a touch device and a touch method. More particularly, the present disclosure relates to a touch device and a touch method utilizing a single light-emitting element and an image sensor.

2. Description of Related Art

Touch panel has become the mainstream panel technology due to convenience and user-friendly. Usually, the touch panel can be categorized into resistive touch panel, capacitive touch panel, acoustic touch panel, optical touch panel and electromagnetic touch panel depending on the different sensing mechanisms.

The conventional optical touch panel utilizes two modules, each includes a sensor and a light-emitting element, disposed at two neighboring corners of the panel respectively and reflection strips are disposed on the other three sides of the panel. Once a stylus or a finger touches the panel (i.e. blocks the light paths between the light-emitting elements and the reflection strip), a dark point is generated on the sensed image of each sensor due to the blocked light paths. The position or the coordinate of the stylus or the finger can be computed according to the dark points in the sensed image. However, the touch device deploying two light-emitting elements and two sensors is not economical enough.

Accordingly, what is needed is a touch device and a touch method utilizing less number of light-emitting element and sensor for realizing the touch input mechanism to lower the cost. The present disclosure addresses such a need.

SUMMARY

An aspect of the present disclosure is to provide a touch device. The touch device senses and computes a coordinate of a touch object. The touch device comprises a panel, a light-emitting element, an image sensor, a reflective strip and a processing unit. The panel has a sensing area successively surrounded by a first boundary, a second boundary, a third boundary and a fourth boundary, wherein a coordinate system is defined by an extension direction of the first and the third boundaries as x-direction and an extension direction of the second and the fourth boundaries as y-direction. The light-emitting element is located on the first boundary and emits a first light and a second light. The image sensor is located on the first boundary with a specific distance relative to the light-emitting element for sensing an image of the sensing area. The reflective strip is located on the second, the third and the fourth boundaries. The processing unit is electrically connected to the image sensor. When the touch object touches the sensing area, a real dark point and a virtual dark point are generated in the image and the processing unit computes the coordinate of the touch object according to positions of the real dark point and the virtual dark point in the image.

Another aspect of the present disclosure is to provide a touch method to sense and compute a coordinate of a touch object. The touch method comprises the steps as follows. (a) providing a panel having a sensing area successively surrounded by a first boundary, a second boundary, a third boundary and a fourth boundary is provided, wherein a coordinate system is defined by an extension direction of the first and the third boundaries as x-direction and an extension direction of the second and the fourth boundaries as y-direction; (b) disposing the touch object in the sensing area to generate a real dark point and a virtual dark point; (c) generating an image to sense the real dark point and the virtual dark point r; (d) computing the coordinate of the touch object according to positions of the real dark point and the virtual dark point images in the image.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
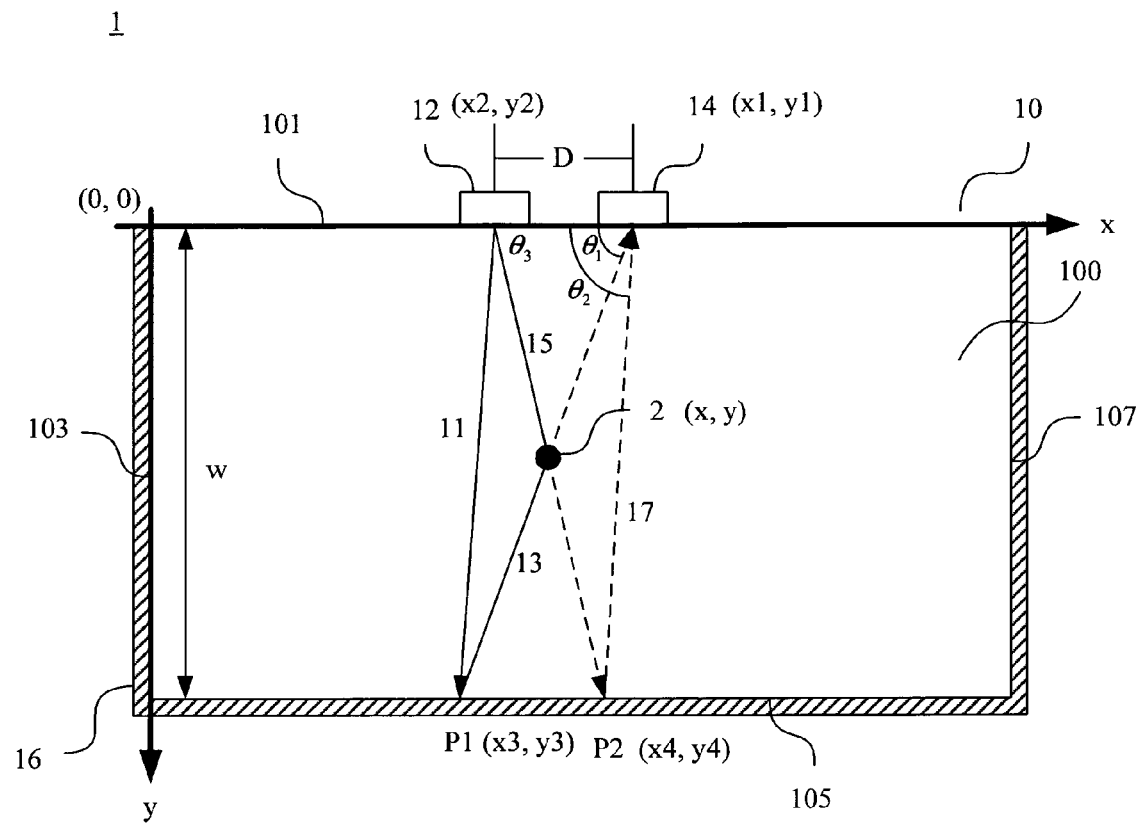
FIG. 1A is a diagram of a touch device in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1A. FIG. 1A is a diagram of a touch device 1 in an embodiment of the present disclosure. The touch device 1 is able to sense and compute the position or the coordinate of a touch object or point 2. The touch device 1 comprises a panel 10, a light-emitting element 12, an image sensor 14, a reflective strip 16 and a processing unit (not shown).

The panel 10 has a sensing area 100 such that the touch object 2 can be disposed therein. The sensing area 100 is surrounded by a first boundary 101, a second boundary 103, a third boundary 105 and a fourth boundary 107. A coordinate system is defined with the extension direction of the first and the third boundaries 101 and 105 as x direction, the extension direction of the second and the fourth boundaries 103 and 107 as y direction, and the left-top corner of the panel 10 as origin point. The coordinate of the light-emitting element 12 (x2, y2), the coordinate of the image sensor 14 (x1, y1), the width W of the panel and the specific distance D between the image sensor 14 and the light-emitting element 12 are all known parameters which can be preset when the touch device 1 is assembled.

The light-emitting element 12 and the image sensor 14 can be located on the first boundary 101 or located on a position at a distance a certain distance from the first boundary 101. In the present embodiment, the light-emitting element 12 and the image sensor 14 are both located on the first boundary 101 with a specific distance D along the x direction therebetween. The specific distance is selected such that the image sensor 14 is able to receive the reflected light from the reflective strip 16, where the reflected light is generated according to light emitted by the light-emitting element 12.

The image sensor 14 performs the sensing process to sense the touch object 2 within the sensing area 100 (by retrieving the image comprising the touch object 2). Substantially, due to the touch object 2 could be placed at any position within the sensing area 100, a suitable (large enough) angle of view is necessary for the image sensor 14 to sense the whole sensing area 100. In an embodiment, if the light-emitting element 12 and the image sensor 14 are located on an end of the first boundary 101 (or a corner of the panel 10), the angle of view of the image sensor 14 has to be larger than or equal to 90 degrees to sense the whole sensing area 100. In the present embodiment, the image sensor 14 is placed at about the middle of the first boundary 101, the angle of view of the image sensor 14 has to be 180 degrees for sensing the whole sensing area 100.

The reflective strip 16 is located on the second boundary 103, the third boundary 105 and the fourth boundary 107 to reflect the light from the light-emitting element 12. The reflective strip 16 can reflect the incident light concentratedly along the incident path back. The term "concentratedly" means that most energy of the incident light is reflected back to the light-emitting element 12 along the incident path. However, it is impossible to reflect 100% of the energy back to the light-emitting element 12 due to the limit of physics. In other words, a small portion of the energy, not reflected back to the light-emitting element 12 along the incident path, is scattered to a neighboring area of the light-emitting element 12, and the farther between the neighboring area and the light-emitting element 12, the more the energy reduces. In the present embodiment, the image sensor 14 utilizes the light not reflected back to the incident path (i.e. the scattered reflected light) to compute the coordinate of the touch object 2. Hence, the distance D between the image sensor 14 and the light-emitting element 12 cannot be too large. If distance D between the image sensor 14 and the light-emitting element 12 is too large, the image sensor 14 is not able to sense the reflected, light since the energy of the reflected light scattered to the image sensor 14 is too low. In a preferable embodiment, the range of the specific distance D along the x direction between the image sensor 14 and the light-emitting element 12 is about 5 mm to 20 mm such that the light reflected to the image sensor 14 has enough energy for the image sensor 14 to perform the sensing process. The processing unit is electrically connected to the image sensor 14. In an embodiment, the processing unit is an internal module of the panel 10 or is integrally formed with the image sensor 14 (integrated with the image sensor 14). The processing unit can convert the position of the touch object 2 within the sensed image to the coordinate of the touch object 2 in the sensing area 2.

When the touch object (a stylus or a finger) touches the sensing area 100, the light from the light-emitting element 12 would be blocked. In details, as described previously, if the touch object 2 is absent, a first light 11 would be reflected at the first reflection point P1 on the reflective strip 16, most energy is reflected back to the light-emitting element 12 along the incidental path and a small portion of the other energy (those not reflected back to the light-emitting element 12) is reflected to the image sensor 14 along a first light path 13 and sensed by the image sensor 14. Besides, a second light 15 would be reflected at the second reflection point P2 on the reflective strip 16, most of the energy is reflected back to the light-emitting element 12 along the incidental path, and a small portion of the other energy (those not reflected back to the light-emitting element 12) is reflected to the image sensor 14 along a second light path 17 and is sensed by the image sensor 14.

Figure 1B:
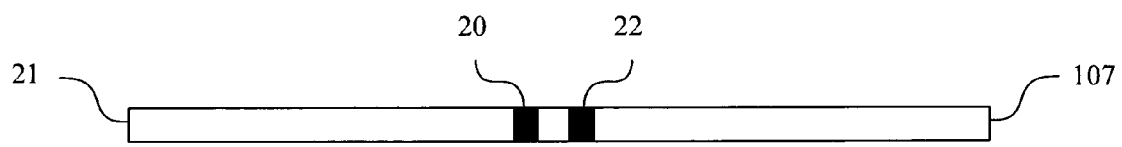
FIG. 1B is a diagram depicting the position of the real dark point and the virtual dark point on the sensed image sensed by the image sensor depicted in FIG. 1.

However, once the touch object 2 touches the sensing area 100, which blocks both the first light path 13 and directly blocks the second light 15 such that a real dark point 20 corresponding to the first light path 13 and a virtual dark point 22 corresponding to the second light path 17 are formed on the sensed image 21 of the image sensor 14 as shown in FIG. 1B. Afterwards, the processing unit can compute the coordinate of the touch object 2 on the coordinate system according to the positions of the real and the virtual dark points 20 and 22 on the sensed image 21.

Figure 2:
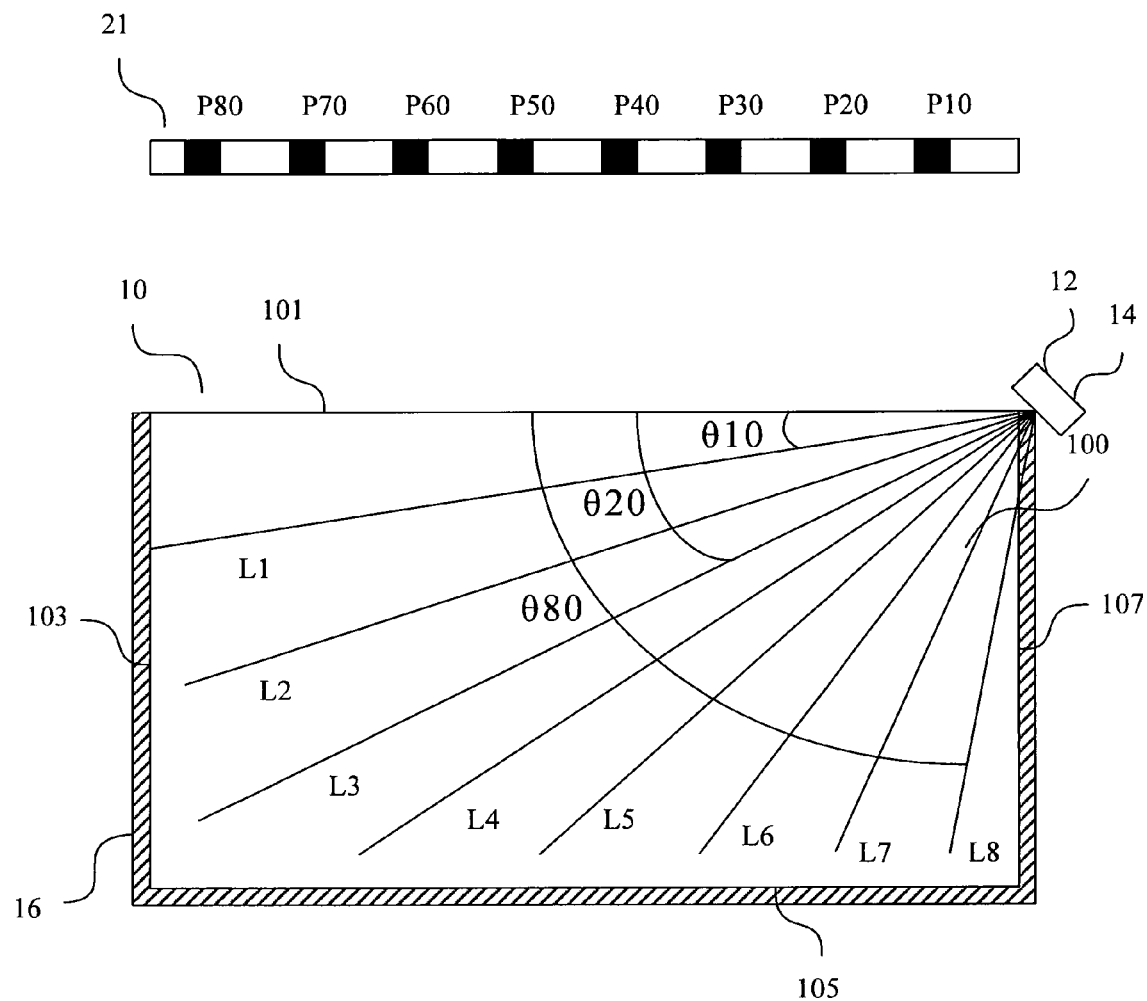
FIG. 2 is a diagram of the touch device when the correctional procedure is performed.

Before describing how to compute the coordinate of the touch object 2, it is necessary to understand how optical procedure is performed on the touch device 1 to obtain a regression curve or optical data such that sensed angles can be computed according to the regression curve and the position of the dark points on the sensed image 21. The so-called sensed angles are the angles relative to the x direction. Please refer to FIG. 2. FIG. 2 is a diagram of the touch device 1 when optical procedure is performed. The light-emitting element 12 and the image sensor 14 are disposed on a corner of the panel 10. The touch object 2 is first placed on a path L1 corresponding to a predetermined first sensed angle $\theta 10$ to form a dark point P10 on the sensed image 21. Then, the touch object 2 is placed on a path L2 corresponding to a predetermined first sensed angle $\theta 20$ to form a dark point P20 on the sensed image 21. The touch object 2 is kept placing at different positions each on a path corresponding to a specific sensed angle until the touch object 2 is placed on a path L8 corresponding to a predetermined first sensed angle $\theta 80$ to form a dark point P80 on the sensed image 21. Hence, a group of images comprises the dark points ($\theta 10, \theta 20, \ldots, \theta 80$) respectively corresponding to different sensed angles ($\theta 10, \theta 20, \ldots, \theta 80$) are obtained. Then, the two groups (positions of the dark points and corresponding sensed angles) of data are used to determine a regression curve or a fitting curve, i.e. the calibration data. The calibration data is stored in the touch device 1. Consequently, once the dark point on the sensed image 21 is known, the sensed angle can be determined by the position of the dark point through the regression curve. It's noticed that the number of the predetermined sensed angles used to perform the calibration procedure is not limited to eight. The number of the predetermined sensed angles can be determined depending on the practical situation. With more predetermined sensed angles, the computed regression curve is closer to the practical angle.

After the calibration procedure is performed, the processing unit stores the calibration data (i.e. the regression curve) that stands for the relation between the positions of the dark points in the sensed image 21 and the sensed angles. It's noticed that since the light-emitting element 12 and the image sensor 14 are placed on the top-right corner of the panel 10 in FIG. 2, 90 degrees for the angle of view of the image sensor 14 is enough. However, for the angle of view of the image sensor 14 having 180 degrees, as depicted in FIG. 1A, the calibration procedure is still similar to the procedure described above.

Please refer to FIG. 1A again. After retrieving the stored calibration data, the processing module computes a first sensed angle of the first light path 13 and a second sensed angle of the second light path 17 according to the positions of the real dark point 20 and the virtual dark point 22 on the sensed image 21 respectively. Assuming that the first sensed angle of the first light path 13 is $\theta 1$ and the second sensed angle of the second light path 17 is $\theta 2$.

As described above, The coordinate of the light-emitting element 12 (x2, y2), the coordinate of the image sensor 14 (x1, y1), the width W of the panel and the specific distance D between the image sensor 14 and the light-emitting element 12 are all known parameters, wherein $$y1=y2;$$

$$x1-x2=D;$$

The processing unit can compute the coordinate (x3, y3) of the first reflection point P1 and the coordinate (x4, y4) of the second reflection point P2:

$$\tan\theta_1 = w/(x_1-x_3)$$

$$\tan\theta_2 = w/(x_1-x_4)$$

where $$y3=y4;$$

$$y3-y1=W$$

Accordingly, (x1, y1), (x2, y2), (x3, y3) and (x4, y4) are known. Then, the angle $\theta_3$ of the second light 15 relative to the x direction can be computed by the following equation:

$$\theta_3 = \tan^{-1}[(y_4-y_2)/(x_4-x_2)]$$

Finally, two linear equations can be obtained according to the known angles $\theta_1$ and $\theta_3$, where (x, y) is the coordinate of the touch object 2 on the sensing area 100:

$$y-y_1 = (\tan\theta_1)(x_1-x)$$

$$y-y_2 = (\tan\theta_3)(x-X_2)$$

By solving the set of linear equations, the solution (x, y), i.e. the coordinate of the touch object 2 on the sensing area, is obtained.

By keeping a distance between the light-emitting element and the image sensor, the image sensor of the touch device of the present disclosure can sense the real dark point and the virtual dark point when the touch object touches the sensing area and blocks two light paths. The coordinate of the touch object can thus be computed with less number of the light-emitting element and the image sensor.

Figure 3:
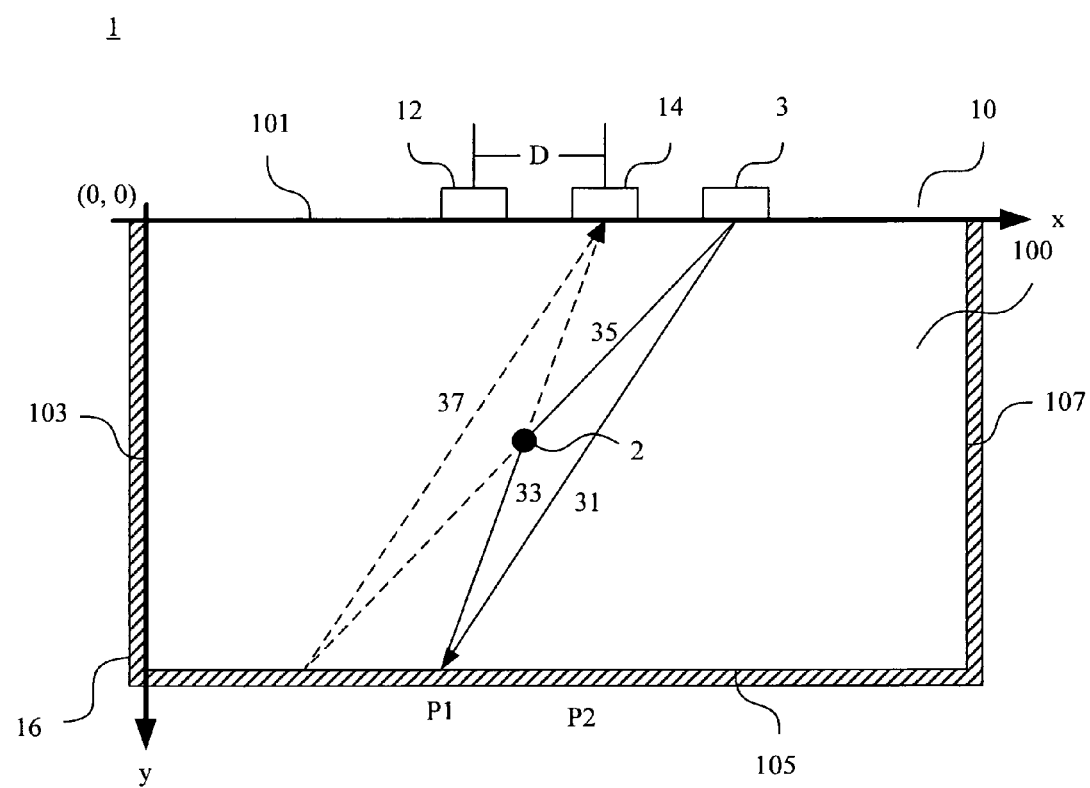
FIG. 3 is the touch device in another embodiment of the present disclosure.

Please refer to FIG. 3. FIG. 3 is the touch device 1 in another embodiment of the present disclosure. Similar to the touch device depicted in FIG. 1, the touch device 1 in FIG. 3 comprises a panel 10, a light-emitting element 12, an image sensor 14, a reflective strip 16 and a processing unit (not shown). In the present embodiment, the touch device 1 further comprises an auxiliary light-emitting element 3.

Similar to the light-emitting element 12, when the touch object 2 touches the sensing area 100, a third light path 33 formed by reflecting a third light 31, which is generated from the auxiliary light-emitting element 3, on the reflective strip 16 to the image sensor 14 is blocked to generate an auxiliary real dark point, and a fourth light 35, generated from the auxiliary light-emitting element 3, is directly blocked such that an auxiliary virtual dark point is generated. The image sensor 14 senses an auxiliary real dark point and an auxiliary virtual dark point into the sensed image 21, then the processing unit computes the coordinate of the touch object 2 on the coordinate system according to the positions of the auxiliary real image and the auxiliary virtual image on the sensed image 21.

It's noticed that in the present embodiment, the image sensor 14 still senses light from the light-emitting element 12. In other words, two light-emitting elements 12 and 3 and one image sensor 14 are used to compute the coordinate of the touch object 2 in the present embodiment. The results obtained respectively are then averaged or weightedly averaged to improve the accuracy of the sensing result. However, when the light-emitting element 12 and the auxiliary light-emitting element 3 are both presented as shown in FIG. 3, they have to be driven non-simultaneously such that the virtual dark point generated by one of the light-emitting elements would not disappear as a result of light-compensation by the other light-emitting element. In other words, when light-emitting element 12 emits the light, the auxiliary light-emitting element 3 should be turned off, and when the auxiliary light-emitting element 3 emits light-emitting element the light, the light-emitting element 12 should be turned off, thus avoiding the unnecessary lights compensate the blocked light path of the virtual dark point resulting in only the real dark point generated on the sensed image 21.

Figure 4:
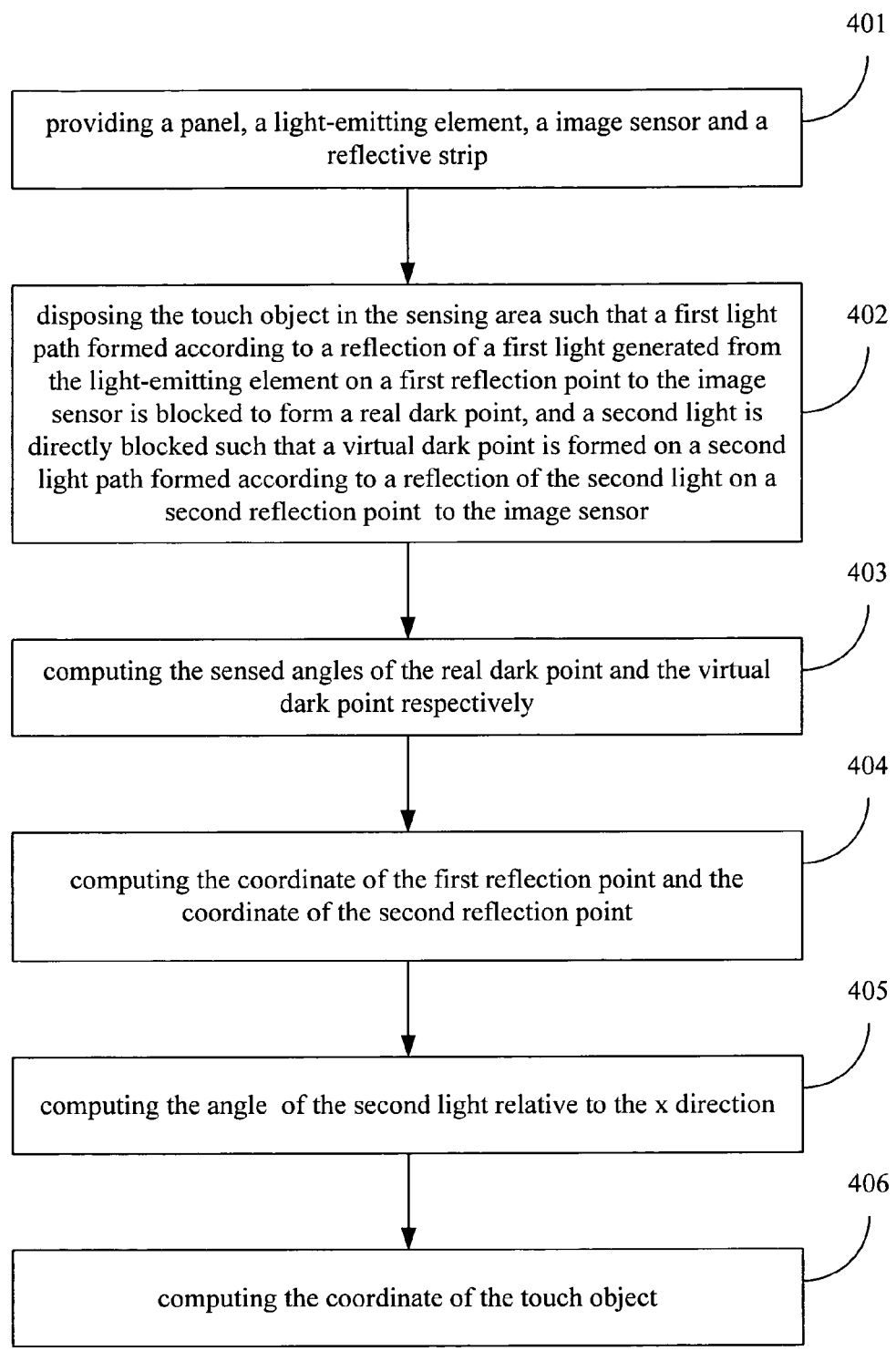
FIG. 4 is a flow chart of a touch method in an embodiment of the present disclosure.

Please refer to FIG. 4. FIG. 4 is a flow chart of a touch method in an embodiment of the present disclosure. The touch method is adapted to the touch device 1 depicted in FIG. 1A and FIG. 3 to sense the touch object 2 and compute the coordinate of the touch object 2. The touch method comprises the steps as follows. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the panel 10, the light-emitting element 12, the image sensor 14 and the reflective strip 16 are provided. The image sensor 14 and the light-emitting element 12 are dispatched with a specific distance D therebetween. The width of the panel 10 is W. The panel 10 has the sensing area 100 surrounded by the first boundary 101, the second boundary 103, the third boundary 105 and the fourth boundary 107. The extension direction of the first and the third boundaries 101 and 105 defines an x-direction and the extension direction of the second and the fourth boundaries 103 and 107 defines a y-direction. With the x-direction and y-direction, the origin point is chosen to be the left-top corner of the panel 10 to define the coordinate system. A processing unit can be further provided in step 401. The coordinate of the light-emitting element 12 (x2, y2) and the coordinate of the image sensor 14 (x1, y1) are known in step 401 already.

In step 402, the touch object 2 is disposed in the sensing area 100 such that a first light path 13, formed by reflecting a first light 11 generated from the light-emitting element 12 on a first reflection point P1, to the image sensor 14 is blocked to generate a real dark point, and a second light 15 is directly blocked such that a virtual dark point is generated on a second light path 17 formed by reflecting the second light 15 on a second reflection point P2 to the image sensor 14.

In step 403, the first sensed angle of the real dark point (on the first light path 13) $\theta_1$ relative to the x direction and the second sensed angle of the virtual dark point (on the second light path 17) $\theta_2$ relative to the x direction are computed respectively. The computing process in step 403 is performed according to the calibration data, wherein in an embodiment, the calibration data is a regression curve or a fitting curve. In an embodiment, the calibration data is pre-stored in the image sensor 14 or the processing unit.

In step 404, the coordinate (x3, y3) of the first reflection point P1 and the coordinate (x4, y4) of the second reflection point P2 are computed. The computing process in step 404 can be performed with the use of triangulation according to the sensed angles $\theta_1$, $\theta_2$, the width W of the panel 10 and the coordinate of the image sensor 14.

In step 405, the angle $\theta_3$ of the second light 15 relative to the x direction is computed. The computing process in step 405 can be performed with the use of triangulation according to the coordinate of the second reflection point P2 (x4, y4) and the coordinate of the light-emitting element 12 (x2, y2).

In step 406, the coordinate of the touch object 2 (x, y) is computed. The computing process in step 406 can be performed with the use of triangulation according to the coordinate of the light-emitting element 12 (x2, y2), the coordinate of the image sensor 14 (x1, y1), the angle $\theta_3$ and the sensed angle $\theta_1$.

In an embodiment, the auxiliary light-emitting element 3 can be provided in step 401 as well to let the touch object 2 block the third light path 33 and the fourth light path 37 in step 402. The image sensor 14 can further sense the real dark point and virtual dark point due to the auxiliary light-emitting element 3 to compute the coordinate of the touch object 2, thus improving the accuracy of the sensing result.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch device for sensing and computing a coordinate of a touch object, wherein the touch device comprises:
   a panel having a sensing area surrounded by a first boundary, a second boundary, a third boundary and a fourth boundary, wherein a coordinate system is defined by an extension direction of the first boundary and the third boundary define as x-direction and an extension direction of the second boundary and the fourth boundary as y-direction;
   a light-emitting element located on the first boundary and emit a first light and a second light;
   an image sensor located on the first boundary with a specific distance relative to the light-emitting element for sensing an image of the sensing area;
   a reflective strip located on the second, the third and the fourth boundaries; and
   a processing unit electrically connected to the image sensor;
   wherein when the touch object touches the sensing area, a real dark point and a virtual dark point are generated in the image;
   wherein the real dark point is formed by blocking a first light path formed by reflecting the first light on a first reflection point of the reflective strip, the virtual dark point is formed by blocking a second light path formed by reflecting the second light on a second reflection point of the reflective strip, and the second light is blocked directly by the touch object before being reflected; and
   wherein the processing unit computes the coordinate of the touch object on the coordinate system according to positions of the real dark point and the virtual dark point in the image.

2. The touch device of claim 1, wherein the processing unit has a calibration data, which is a relationship between position in the image and a sensed angle.

3. The touch device of claim 2, wherein the sensed angle is an angle relative to the x direction.

4. The touch device of claim 2, wherein the processing unit computes a first sensed angle of the first light path and a second sensed angle of the second light path according to the calibration data.

5. The touch device of claim 4, wherein the processing unit further computes a first coordinate of the first reflection point and a second coordinate of the second reflection point according to the first sensed angle and the second sensed angle.

6. The touch device of claim 5, wherein the processing unit further computes an angle of the second light relative to the x direction according to the first coordinate and the second coordinate.

7. The touch device of claim 6, wherein the processing unit further computes the coordinate of the touch object according to the angle of second light.

8. The touch device of claim 1, further comprising an auxiliary light-emitting element, wherein the light-emitting element and the auxiliary light-emitting element are driven non-simultaneously.

9. The touch device of claim 1, wherein a range of the specific distance is from 5 mm to 20 mm.

10. The touch device of claim 1, wherein an angle of view the image sensor is larger than or equal to 90 degrees.

11. A touch method to sense and compute a coordinate of a touch object, wherein the touch method comprises the steps of:
   (a) providing a panel having a sensing area surrounded by a first boundary, a second boundary, a third boundary and a fourth boundary, wherein a coordinate system is defined by an extension direction of the first boundary and the third boundary as x-direction and an extension direction of the second boundary and the fourth boundary as y-direction, and wherein a reflective strip is located on the second, the third and the fourth boundaries;
   (b) disposing the touch object in the sensing area to generate a real dark point and a virtual dark point, wherein the real dark point is formed by blocking a first light path formed by reflecting the first light on a first reflection point of the reflective strip, the virtual dark point is formed by blocking a second light path formed by reflecting the second light on a second reflection point of the reflective strip, and the second light is blocked directly by the touch object before being reflected;
   (c) generating an image for sensing the real dark point and the virtual dark point; and
   (d) computing the coordinate of the touch object according to positions of the real dark point and the virtual real dark in the image.

12. The touch method of claim 11, further comprising a step of:
   providing a calibration data, which is a relationship between position in the image and a sensed angle.

13. The touch method of claim 12, wherein the sensed angle is an angle relative to the x direction.

* * * * *